(12) United States Patent
Watson et al.

(10) Patent No.: US 8,554,180 B2
(45) Date of Patent: Oct. 8, 2013

(54) SYSTEM TO DYNAMICALLY AUTHENTICATE MOBILE DEVICES

(75) Inventors: Alexander C. Watson, Severn, MD (US); Sean L. Lane, Sykesville, MD (US)

(73) Assignee: Battlefield Telecommunications Systems, LLC, Columbia, MD (US)

( * ) Notice: Subject to any disclaimer, the term of this patent is extended or adjusted under 35 U.S.C. 154(b) by 0 days.

(21) Appl. No.: 13/408,417

(22) Filed: Feb. 29, 2012

(65) Prior Publication Data
US 2012/0164985 A1    Jun. 28, 2012

Related U.S. Application Data

(62) Division of application No. 12/967,785, filed on Dec. 14, 2010, now Pat. No. 8,320,883.

(51) Int. Cl.
*H04M 1/66* (2006.01)

(52) U.S. Cl.
USPC .......................................................... 455/411

(58) Field of Classification Search
USPC .............. 455/414.1, 411, 558, 445, 436, 433, 455/450, 435.1; 726/28, 20, 21, 5; 713/173, 713/172; 370/352
See application file for complete search history.

(56) References Cited

U.S. PATENT DOCUMENTS

| | | | |
|---|---|---|---|
| 8,249,592 B1 * | 8/2012 | Nielsen et al. | 455/435.1 |
| 2007/0149240 A1 | 6/2007 | Brok | |
| 2008/0129588 A1 | 6/2008 | Lundgren et al. | |
| 2008/0307515 A1 | 12/2008 | Drokov et al. | |
| 2009/0068988 A1 | 3/2009 | Cofta | |
| 2009/0191846 A1 * | 7/2009 | Shi | 455/411 |
| 2009/0217038 A1 | 8/2009 | Lehtovirta et al. | |
| 2009/0253406 A1 | 10/2009 | Fitzgerald et al. | |
| 2010/0035587 A1 * | 2/2010 | Bennett | 455/414.1 |
| 2010/0050241 A1 * | 2/2010 | Yan et al. | 726/5 |
| 2010/0099412 A1 | 4/2010 | Ramachandran et al. | |
| 2010/0205316 A1 | 8/2010 | Xue et al. | |

FOREIGN PATENT DOCUMENTS

WO    WO 2010/064128    6/2010

* cited by examiner

*Primary Examiner* — Kiet Doan
(74) *Attorney, Agent, or Firm* — McKenna Long & Aldridge LLP

(57) ABSTRACT

The present invention provides a secure, dynamic and customizable system and method for authenticating a mobile device in a wireless network, in accordance with the security policies associated with the wireless network. The system and method involve a trusted authentication and device management application stored on the SIM card of the mobile device in a memory space that is protected and only accessible by the network operator. Moreover, authentication is based, at least in part, on information that relates to the environment of the mobile device, the information being available to the authentication application through the operating system of the mobile device.

20 Claims, 3 Drawing Sheets

SYSTEM TO DYNAMICALLY AUTHENTICATE MOBILE DEVICES

This application is a divisional of prior U.S. patent application Ser. No. 12/967,785 filed Dec. 14, 2010 now U.S. Pat. No. 8,320,883 which is incorporated herein by reference in its entirety as if fully set forth herein.

BACKGROUND OF THE INVENTION

1. Field of the Invention

The present invention relates to the authentication of mobile devices accessing or operating in wireless networks. More particularly, the present invention involves authentication of mobile devices using an authentication application stored in memory on a universal integrated circuit card (UICC) with subscriber identity module (SIM) functionality. Even more particularly, the present invention involves authentication of mobile devices based on information that characterize the mobile device's environment.

2. Discussion of the Related Art

Wireless networks employ protection measures designed to prevent unauthorized network access. This is necessary in order to prevent access to and the corruption and/or confiscation of data and other information being conveyed over the network. As network security measures become more sophisticated in an attempt to provide greater levels of security, the tools and techniques used to defeat these measures to gain unauthorized access to the networks have likewise become more sophisticated.

In general, most wireless network security measures provide less than adequate security because they provide minimal protection against attack, leaving the mobile device, its hardware, software and data vulnerable to compromise. Moreover, these security measures are generally inflexible and unable to adapt to ever changing security policies established by the network operator. Accordingly, there is a substantial demand for a wireless network security system and method that provides additional levels of security, is less vulnerable to attack, and is flexible with respect to changes in security policies and practice established by the network operator.

SUMMARY OF THE INVENTION

Accordingly, the present invention is directed to a system and a method for dynamically authenticating mobile devices attempting to gain access to or maintain access with a wireless network, where the system and method substantially obviate one or more of the aforementioned problems associated with related art systems and methods. In general, the present invention achieves this by employing a UICC (referred to herein as "SIM card") that stores an authentication application that, when executed, provides authentication for the host mobile device. The authentication application resides in a protected memory on the SIM card, and it is able to communicate with the operating system of the mobile device to obtain information that characterizes the environment of the mobile device. Authentication and, therefore, network access can be granted or denied to the device from the network based on the environmental data returned from the trusted application running on the SIM card.

One advantage of the present invention is that it is capable of providing a far more secure authentication process compared to related art systems and methods due to the fact that a SIM card operates as independent, trusted hardware that has unique access to information on the mobile device.

Still another advantage of the present invention is that it is capable of providing dynamic authentication, that is, the mobile device can be authenticated even if the authentication criteria is periodically or continuously modified by the network operator In accordance with a first aspect of the present invention, the above-identified and other advantages are achieved through a method for authenticating a mobile device in a wireless network. The method comprises transmitting a message to the mobile device and requesting information from the mobile device, wherein the information characterizes the environment of the mobile device. The method also involves receiving from the mobile device the information that characterizes the environment of the mobile device; processing the information received from the mobile device that characterizes the environment of the mobile device; and granting network access to the mobile device based on the information received from the mobile device.

In accordance with a second aspect of the present invention, the above-identified and other advantages are achieved through a method for authenticating a mobile device in a wireless network. The method comprises receiving a message from the network operator and retrieving information through the operating system of the mobile device in response to the message, wherein the information characterizes the environment of the mobile device. The method also involves transmitting the information that characterizes the environment of the mobile device to the network operator and receiving access to the wireless network in response to the transmission of the information that characterizes the environment of the mobile device.

In accordance with a third aspect of the present invention, the above-identified and other advantages are achieved by a wireless network that comprises a network operator and a mobile device, where the mobile device comprises an operating system; a Subscriber Identity Module (SIM) card having protected and unprotected memory, the protected memory having stored thereon an authentication application; and an Application Programming Interface (API). The API comprises means for processing an authentication message from the network operator, means for communicating with the operating system, in response to the authentication message, through the API to retrieve information that characterizes the environment of the mobile device, means for making available for the network operator, the information characterizing the environment of the mobile device.

In accordance with a fourth aspect of the present invention, the above-identified and other advantages are achieved by a mobile device that comprises an operating system; a Subscriber Identity Module (SIM) card having protected and unprotected memory, the protected memory having stored thereon an authentication application; and an Application Programming Interface (API). The API comprises means for processing an authentication message from a network operator, means for communicating with the operating system, in response to the authentication message, through the API to retrieve information that characterizes the environment of the mobile device, means for making available for the network operator, the information characterizing the environment of the mobile device.

It is to be understood that both the foregoing general description and the following detailed description are exemplary and explanatory. They are intended to provide further explanation of the invention, the scope of which is set forth in the appended claims.

BRIEF DESCRIPTION OF THE DRAWINGS

The accompanying drawings, together with the Detailed Description serve to explain the principles of the present invention. In the drawings.

DETAILED DESCRIPTION OF THE ILLUSTRATED EMBODIMENTS

Reference will now be made to at least one exemplary embodiment of the present invention. The at least one exemplary embodiment is fully illustrated in the accompanying drawings.

Figure 1:
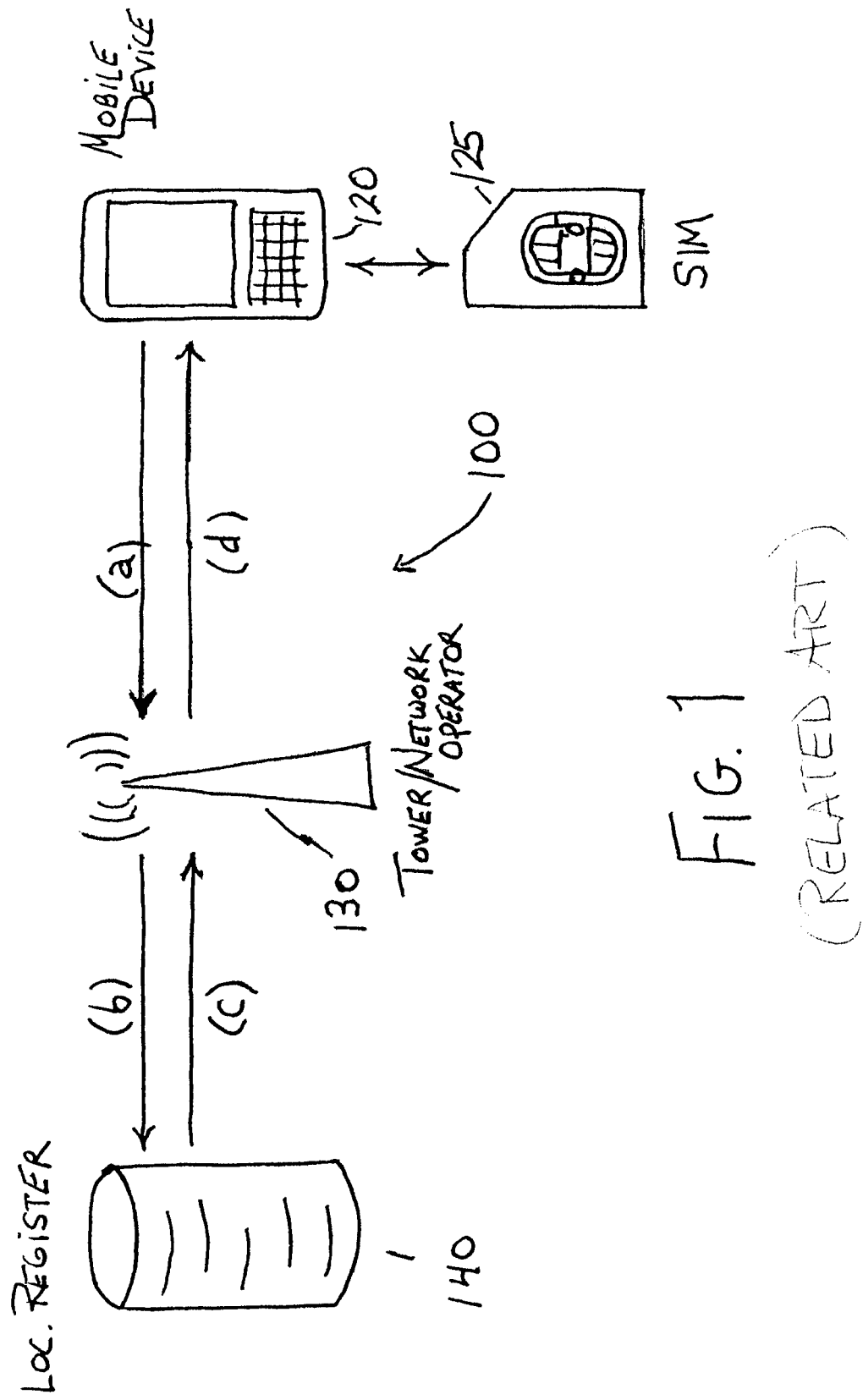
FIG. 1 illustrates a system configuration and authentication sequence for a mobile device in a wireless network, in accordance with the related art.

FIG. 1 illustrates a system configuration and authentication sequence 10 for authenticating a mobile device in a wireless network, in accordance with the related art. As shown, when a mobile device 120 requires network access, it will initiate the authentication sequence by transmitting a registration request (a) to the network through a network access point, such as cell tower 130. The registration request typically includes an identification number or code that uniquely identifies the mobile device 120 and a cryptographic challenge using a 128-bit encryption key stored in the protected memory space of a SIM card. In a GSM or UMTS network, the identification number or code maybe the International Mobile Subscriber Identity (IMSI), which is a 64 bit sequence that is stored on the mobile device's SIM card 125. The encryption key is stored in the protected memory space of the SIM card and cannot be accessed directly, rather it responds to cryptographic challenges. The IMSI is typically secured using encryption keys. The registration request is received by the network operator which, for ease of discussion and illustration, is shown in combination with cell tower 130.

The network operator then checks (b) the IMSI against a list that is typically stored in a location register 140, such as a home location register (HLR) if the mobile device 120 is operating in its home network, or a visiting location register (VLR) if the mobile device 120 is roaming. The result (c) is returned to the network operator which then communicates (d) with the mobile device 120. If the IMSI of mobile device 120 is amongst those stored in the location register 140 and the device responds correctly to the cryptographic challenge, the network operator will authenticate the mobile device 120, thereby permitting the mobile device 120 to access the network. Thereafter, the mobile device 120 may establish and maintain voice and/or data sessions. This system configuration and authentication sequence is well-known in the art.

The above-described configuration and authentication sequence offer a basic layer of security by denying access to unauthorized mobile devices if they cannot produce a valid IMSI and cryptographic challenge. However, should the IMSI or cryptographic key become compromised, for example, if the SIM card 125 is stolen or lost and the SIM card is placed in a different mobile device which is in the possession of an unauthorized user, network access is possible and network assets and data may be at risk.

Figure 2:
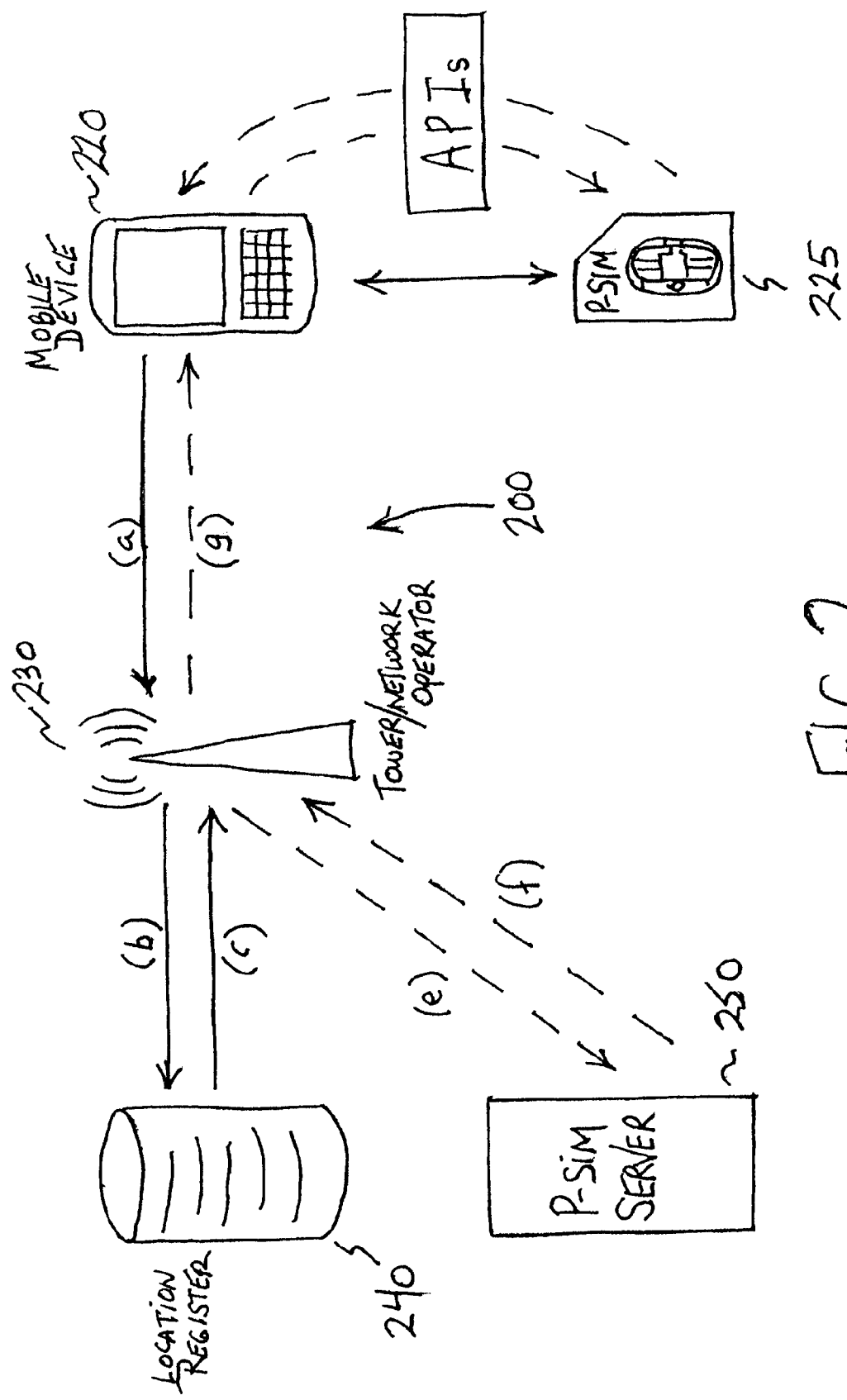
FIG. 2 is a diagram illustrating a system configuration and authentication sequence for a mobile device in a wireless network, in accordance with exemplary embodiments of the present invention.

FIG. 2 is a diagram illustrating a system configuration and authentication sequence 200 for authenticating a mobile device 220 in a wireless network, in accordance with exemplary embodiments of the present invention. As in the configuration and authentication sequence 100 illustrated in FIG. 1, authentication may be initiated in the same or like manner. Thus, the mobile device 220 may transmit a registration request (a) to the cell tower 230 in an attempt to register with the wireless network. The cell tower 230, and more particularly, the network operator, may then communicate (b) with the location register 240 to determine whether the mobile device's IMSI and authentication keys are valid. The location register 240 will communicate (c) back to the network operator. If the IMSI or cryptographic responses are not valid, authentication will fail and the network operator will deny the mobile device 220 network access. If, however, the IMSI is valid, authentication will provisionally succeed and the network operator will proceed to a next or second phase of the authentication sequence, in accordance with exemplary embodiments of the present invention.

In accordance with the next or second phase of the authentication sequence, the network operator communicates (e) with a network server operating in conjunction with or parallel to the network operator. For ease of discussion, we refer herein to this network server as the P-SIM server 250. As will become readily apparent to those skilled in the art, the P-SIM server 250 together with an authentication application, referred to herein as the P-SIM application, residing in protected memory space on SIM card 225, provide a second level of security, greater than and in addition to the level of security provided by the first phase of the authentication sequence described above.

The P-SIM server 250 initiates this second phase of the authentication sequence by issuing a device challenge to mobile device 220. The P-SIM server 250 may do this by sending a challenge message (f) to the network operator, which then relays the challenge message (g) to mobile device 220. The message may take the form of a control message or a short message service (SMS) message. Typically, SMS messages utilize fewer network resources. Thus, transmitting the challenge message in the form of an SMS message may be more efficient. The message may also take the form of a TCP/IP based message.

Ultimately, the P-SIM application, residing in protected memory on the SIM card 225, will respond to the challenge message from the P-SIM server 250 by communicating with the mobile device's operating system in order to obtain specific information relating to the mobile device's environment. Assuming the P-SIM application obtains the correct information; the network operator will authenticate the mobile device 220 and, therefore, grant the mobile device 220 network access. A further description of the information relating to the mobile device's environment will be provided below.

In accordance with an alternate, exemplary embodiment of the present invention, the mobile device 220 may, instead of answering the challenge, initiate a challenge back. That is, the mobile device 220 will initiate its own challenge to the network operator. The purpose of returning the challenge would be to add yet another level of security to the authentication process by preventing rogue devices from masquerading as authorized network devices in an attempt to deceive the mobile device 220 into believing it is communicating with an authorized device, thereby exposing the mobile device 220 to attack or at least rendering data and other information open to compromise.

The P-SIM application is, in accordance with exemplary embodiments of the present invention, a Java-based application (i.e., it is Java card compatible). Thus, it will work with any Java card compatible SIM in any GSM or UMTS mobile device. Further, the P-SIM application, as previously stated, resides on and is executed from memory on the SIM card 225, which includes special circuitry that walls-off and protects the memory. Only the network operator can access and/or control the P-SIM application through the use of special security certificates that are burned into the SIM by the manufacturer. Messages emanating from devices other than the network operator cannot reach or penetrate this protected memory space unless they are routed through a message filter at the network operator. Additionally, the SIM card is self-disabling if it is tampered with. For these reasons, the SIM card is considered a highly trusted hardware component that operates at the very lowest, most secure access level of the host mobile device.

Figure 3:
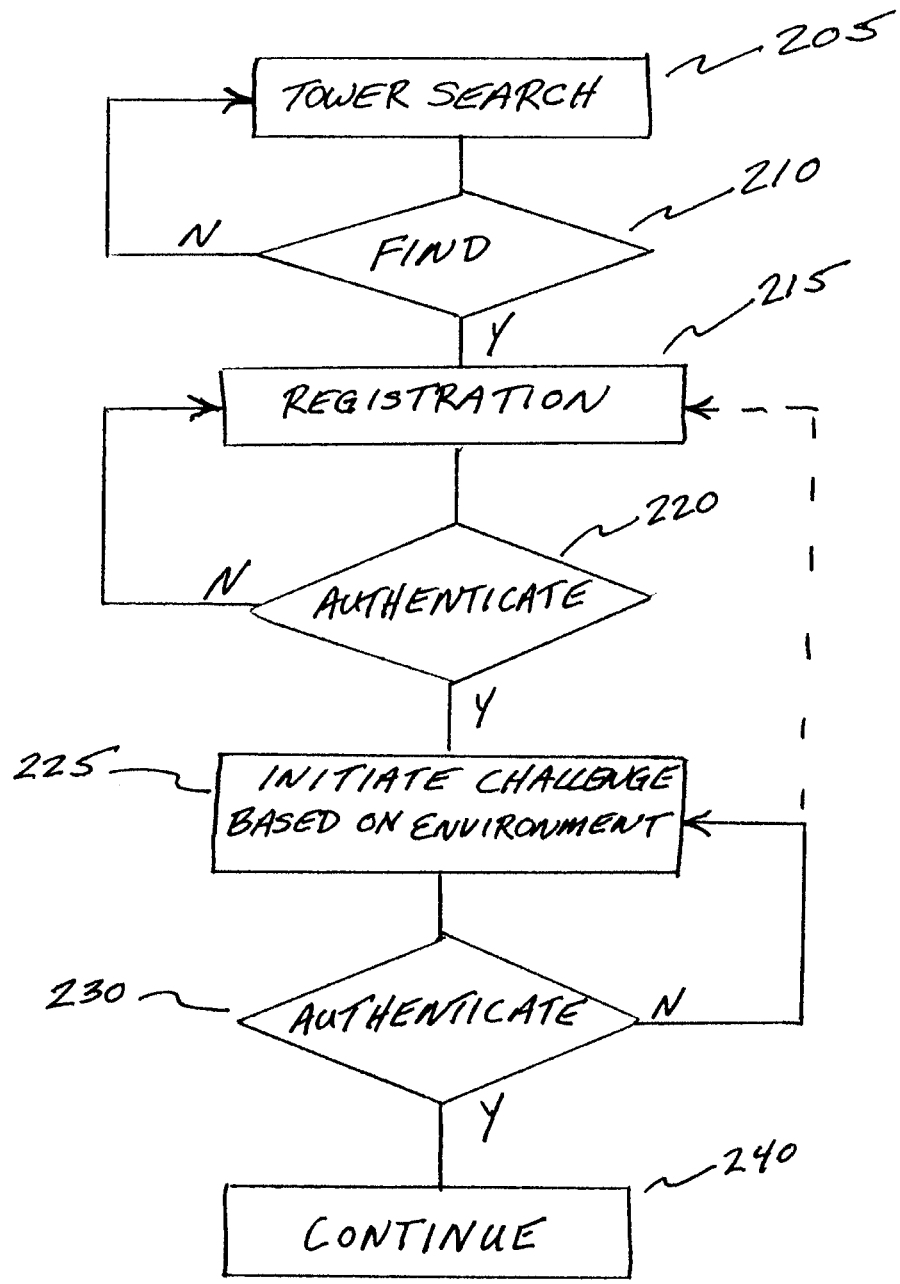
FIG. 3 is a flow diagram illustrating a method for authenticating a mobile device in a wireless network, in accordance with exemplary embodiments of the present invention.

FIG. 3 is a flowchart is a flow that illustrates a method by which a mobile device achieves authentication in order to again access to or maintain access with a wireless network, in accordance with exemplary embodiments of the present invention. When a mobile device is first powered-on or when a mobile device first enters a geographic region covered by the wireless network, but prior to initiating the authentication process, the mobile device will, in accordance with step 205, search for a network access point, for example, cell tower 230. If the mobile device does not find a cell tower within range, the mobile device will, in general, continue to search, in accordance with the "No" path out of step 210, until it finds a cell tower, in accordance with the "YES" path out of step 210. The process of searching for a cell tower is well-known in the art.

Once the mobile device finds a tower, it may initiate authentication by requesting to register with the network, as illustrated in step 215. This may involve the mobile device transmitting a registration request that includes an identification number that uniquely identifies the mobile device, such as the IMSI stored on the mobile device's SIM card. The IMSI is generally encrypted and transmitted to the network operator. The network operator decrypts the IMSI and uses it, as explained above, to determine if the mobile device is authorized to access the network. If the network operator determines, based on the IMSI, that the mobile device is not authorized to access the network, in accordance with the "NO" path out of step 220, the network operator may re-attempt to authorize the mobile device or terminate the registration process (not shown). If, however, the network operator determines, based on the IMSI, that the mobile device is authorized to access the network, according to the "YES" path out of step 220, access to the network is provisionally granted, and a first phase of the authentication process is complete. In general, the steps associated with this first phase of the authentication process are well known in the art.

At this point, the network operator, in conjunction with a P-SIM server will initiate a second phase of the authentication process by issuing a challenge to the mobile device. As indicated in step 225, and as explained above, the challenge may take the form of an SMS message transmitted but transparent to the mobile device. Whether the mobile device can successfully meet the challenge will depend upon whether the P-SIM application residing on the SIM card can retrieve, through the operating system of the mobile device, certain specific information relating to the environment of the mobile device. If the P-SIM application does not retrieve the information, the second authentication phase will not succeed as indicated by the "NO" path out of step 230. The network operator may attempt to re-challenge the mobile device or terminate the authentication process, in which case, the mobile device will not be granted access to the wireless network. If, on the other hand, the P-SIM application does retrieve the correct information relating to the environment of the mobile device, the network operator will, upon receiving the information, authenticate and, therefore, grant the mobile device network access, in accordance with the "YES" path out of step 230.

The authentication method illustrated in FIG. 3 may continue, according to step 240, in that periodic authentication may be required in order for the mobile device to maintain network access. Alternatively, a mutual authentication process may be employed, wherein the mobile device, after being authenticated by the network operator, initiates a challenge back to the network operator to prevent against rogue network devices from attempting to deceive the mobile device into believing the rogue device is an authorized network device and, therefore, exposing itself to the rogue device, as explained above.

Referring back to method step 225, as well as FIG. 2, the additional level of security provided by the present invention in the second phase of the authentication process is due, at least in part, to the use of certain specific information that characterizes the environment of the mobile device. More particularly, the P-SIM application, upon receiving the challenge from the network operator, communicates with the operating system of the mobile device, through an Application Programming Interface (API) and the use of a SIM toolkit (STK) or SIM application toolkit (SAT), to retrieve the aforementioned information that characterizes the environment of the mobile device. Information that characterizes the environment of the mobile device will now be described by way of example.

For the purpose of illustration and not limitation, the network operator, based on and in an attempt to enforce the security policies of the network, may authenticate and, therefore, grant or deny network access to the mobile device based on the geographic location of the mobile device. Thus, information relating to the geographic location of the mobile device is a first example of information relating to the environment of the mobile device. Geographic location may be based on, for example, Global Positioning System (GPS) information, cell tower information, e.g., the identity of and, therefore, the location of the base station to which the mobile device is connected, the public land mobile network (PLMN) identifier code comprised of the mobile country code (MCC) and mobile network code (MNC) of the operator stored on the SIM card. In more advanced configurations, the SIM card could initiate a trace through the network to map all of the connections necessary to reach the P-SIM server. In the event that any of the connections are untrusted, the P-SIM application would cease communication with the server. In another example, if the mobile device is operating in a geographic location that is not considered secure or trusted, or is otherwise unauthorized in accordance with the security policies of the network operator, authentication may fail and network access may be denied. The P-SIM application would be capable of accessing this information through communication with the mobile device's operating system.

A second example of information that relates to the environment of the mobile device may be information that identifies the network to which the mobile device is immediately connected. Thus, the network operator may utilize information such as the mobile network code (MNC) of the network through which the mobile device is immediately connected in order to determine whether the mobile device should be authenticated and granted network access. Again, if this immediate network is not a trusted network, authentication may fail and network access may be denied.

Yet another example of information that relates to the environment of the mobile device may be biometric data, that is, data that physically identifies the user of the mobile device. This may involve the use of finger print information, voice recognition data, and the like. Accordingly, if the network operator determines that the biometric data obtained and provided by the P-SIM application does not match an authorized user, authentication may fail and network access may be denied.

Still another example of information that relates to the environment of the mobile device is call contact information, or any other information that may characterize how the mobile device has been used. So, for instance, if the network operator determines, based on the authentication process that the mobile device has a pattern of use, such as connecting to websites that are not trusted or making telephone calls to telephone numbers that are unauthorized, authentication may fail and network access may be denied.

Still further, another example, of information that relates to the environment of the mobile device is the profile of the mobile device itself. Such information may uniquely identify the mobile device or identify what processes and applications are being employed by the mobile device. Thus, for example, if the network operator determines that the mobile device cannot be uniquely identified or that the mobile device has been used to execute programs, processes or applications that are not in accordance with the security policies of the network, authentication may fail and network access may be denied.

The present invention provides additional levels of security during the authentication process in many ways. One way the present invention provides this added security is by storing and executing the authentication application from protected memory space on the mobile device SIM card, which is only accessible by the network operator. Moreover, greater overall security is provided because the authentication application is, as stated, stored on the SIM card which communicates with the operating system of the mobile device at the lowest, most secure level. Another way the present invention provides this additional security is by making authentication dependent on the authentication application transparently retrieving certain specific mobile device information, that is, information that specifically characterizes the environment of the authorized host mobile device. As such, the SIM card, and the authentication applications stored thereon, are locked to the host mobile device, thereby preventing someone from using the SIM card and the authentication application with an unauthorized device. In yet another way, the present invention provides additional levels of security because authentication is dynamic and customizable, that is, the authentication process can be adjusted, as needed, by the network operator to fulfill ever-changing network security policies, which may be necessary to meet ever-changing threats to network security. The network operator can achieve this in a secure way as it is the only network device that has access to the SIM card memory.

It will be apparent to those skilled in the art that various modifications and variation can be made to the present invention without departing from the spirit or scope of the invention. Thus, it is intended that the present invention cover these modifications and variations provided they come within the scope of the appended claims and their equivalents.

The invention claimed is:

1. A wireless network comprising:
   a first authentication network receiving a registration request from a mobile device and provisionally granting the mobile device access to a wireless network; and
   a second authentication network transmitting a challenge message to the mobile device to request information from the mobile device that characterizes an environment of the mobile device, receiving the information from the mobile device that characterizes the environment of the mobile device, and granting access to the wireless network;
   wherein the mobile device comprises:
   an operating system;
   a Subscriber Identity Module (SIM) card having protected and unprotected memory, the protected memory having stored thereon an authentication application; and
   an Application Programming Interface (AP1), wherein the authentication application comprises means for processing a challenge message from the second authentication network, means for communicating with the operating system, in response to the challenge message, through the API to retrieve information that characterizes the environment of the mobile device, and means for making available for the second network, the information characterizing the environment of the mobile device;
   wherein the information that characterizes the environment of the mobile device relates to a geographic location of the mobile device; and
   wherein the information that relates to the geographic location of the mobile device is a mobile country code.

2. The network of claim 1, wherein the challenge message is a SMS message.

3. The network of claim 1, wherein the information that relates to the geographic location of the mobile device is GPS information.

4. The network of claim 1, wherein the information that relates to the geographic location of the mobile device is a cell identifier.

5. The network of claim 1, wherein the information that characterizes the environment of the mobile device identifies a second network to which the mobile device is presently connected.

6. The network of claim 5, wherein the information that identifies a second network is a mobile network code.

7. The network of claim 1, wherein the information that characterizes the environment of the mobile device is biometric information.

8. The network of claim 1, wherein the information that characterizes the environment of the mobile device relates to past usage of the mobile device.

9. The network of claim 1, wherein the information that characterizes the environment of the mobile device relates to the profile of the mobile device.

10. The network of claim 1, wherein the challenge message is a TCP/IP based message.

11. A mobile device comprising:
   an operating system;
   a Subscriber Identity Module (SIM) card having protected and unprotected memory, the protected memory having stored thereon an authentication application; and
   an Application Programming Interface (API), wherein the authentication application comprises means for processing an authentication message from a network operator of a second network after the mobile device is provisionally granted access to a first network, means for communicating with the operating system, in response to the authentication message, through the API to retrieve information that characterizes the environment of the mobile device, means for making available for the network operator the information characterizing the environment of the mobile device, and accepting a grant of the mobile device to the network, wherein the grant is in response to availability of the information characterizing the environment of the mobile device for the network operator;

wherein the information that characterizes the environment of the mobile device relates to a geographic location of the mobile device; and wherein the information that relates to the geographic location of the mobile device is a mobile country code.

12. The mobile device of claim 11, wherein the authentication message is a SMS message.

13. The mobile device of claim 11, wherein the information that relates to the geographic location of the mobile device is GPS information.

14. The mobile device of claim 11, wherein the information that relates to the geographic location of the mobile device is a cell identifier.

15. The mobile device of claim 11, wherein the information that characterizes the environment of the mobile device identifies a second network to which the mobile device is presently connected.

16. The mobile device of claim 15, wherein the information that identifies a second network is a mobile network code.

17. The mobile device of claim 11, wherein the information that characterizes the environment of the mobile device is biometric information.

18. The mobile device of claim 11, wherein the information that characterizes the environment of the mobile device relates to past usage of the mobile device.

19. The mobile device of claim 11, wherein the information that characterizes the environment of the mobile device relates to the profile of the mobile device.

20. The mobile device of claim 11, the authentication message is a TCP/IP based message.

* * * * *